United States Patent
Zhou et al.

(10) Patent No.: US 11,701,996 B2
(45) Date of Patent: Jul. 18, 2023

(54) DEEP LEARNING BASED BEAM CONTROL FOR AUTONOMOUS VEHICLES

(71) Applicant: Motional AD LLC, Boston, MA (US)

(72) Inventors: Lubing Zhou, Singapore (SG); Xiaoli Meng, Singapore (SG); Karan Rajendra Shetti, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/528,701

(22) Filed: Nov. 17, 2021

(65) Prior Publication Data
US 2023/0150418 A1  May 18, 2023

(51) Int. Cl.
*B60Q 1/08* (2006.01)
*B60Q 1/14* (2006.01)
*G06V 20/58* (2022.01)
*G06V 20/56* (2022.01)

(52) U.S. Cl.
CPC .............. *B60Q 1/085* (2013.01); *B60Q 1/143* (2013.01); *G06V 20/56* (2022.01); *G06V 20/584* (2022.01); *G06F 2218/08* (2023.01)

(58) Field of Classification Search
CPC .... B60Q 1/085; B60Q 1/143; G06K 9/00523; G06K 9/00; G06V 20/56; G06V 20/584; G06V 10/141; G06V 30/1431
See application file for complete search history.

(56) References Cited

U.S. PATENT DOCUMENTS

| | | | |
|---|---|---|---|
| 2004/0143380 A1* | 7/2004 | Stam | B60Q 1/18 340/467 |
| 2018/0025234 A1* | 1/2018 | Myers | G06V 10/82 348/148 |
| 2019/0152379 A1* | 5/2019 | Biswal | B60Q 1/143 |
| 2020/0082219 A1* | 3/2020 | Li | G06N 3/0454 |
| 2020/0086879 A1* | 3/2020 | Lakshmi Narayanan | G06V 40/20 |
| 2021/0026355 A1* | 1/2021 | Chen | G06V 10/82 |
| 2021/0046861 A1* | 2/2021 | Li | B60Q 1/143 |
| 2021/0142107 A1* | 5/2021 | Vineet | G06K 9/627 |
| 2021/0342608 A1* | 11/2021 | Smolyanskiy | G06K 9/627 |
| 2021/0406560 A1* | 12/2021 | Park | G06T 7/50 |

FOREIGN PATENT DOCUMENTS

EP          3159853          4/2017

OTHER PUBLICATIONS

[No Author Listed], "SAE: Suiface Vehicle Recommended Practice, Taxonomy and Definitions for Terms Related to Driving Automation Systems for On-Road Motor Vehicles," SAE International, Sep. 30, 2016, 30 pages.

* cited by examiner

*Primary Examiner* — Mohammed S Rahaman
(74) *Attorney, Agent, or Firm* — Fish & Richardson P.C.

(57) ABSTRACT

Provided are systems and methods for a deep learning based beam control. Sensor data associated with the environment and the corresponding detected objects from a perception system are obtained. Object features and image features are extracted. The extracted object features and image features are fused into fused features. A beam control status is predicted according to the fused features, wherein the beam control status indicates a high beam illumination intensity or a low beam illumination intensity of a light emitting device.

20 Claims, 13 Drawing Sheets

600

DEEP LEARNING BASED BEAM CONTROL FOR AUTONOMOUS VEHICLES

BACKGROUND

Vehicles generally include one or more light emitting devices to illuminate the interior or exterior of the vehicle. For example, interior light emitting devices provide lighting that illuminates the interior of the vehicle, thereby increasing visibility inside the vehicle. Exterior light emitting devices, such as headlamps, provide lighting that illuminates the environment surrounding the vehicle. In particular, headlamps illuminate an area ahead of the vehicle. Control of light emissions by the autonomous vehicle is an essential capability for the autonomous vehicle to safely navigate an environment.

DETAILED DESCRIPTION

Figure 1:
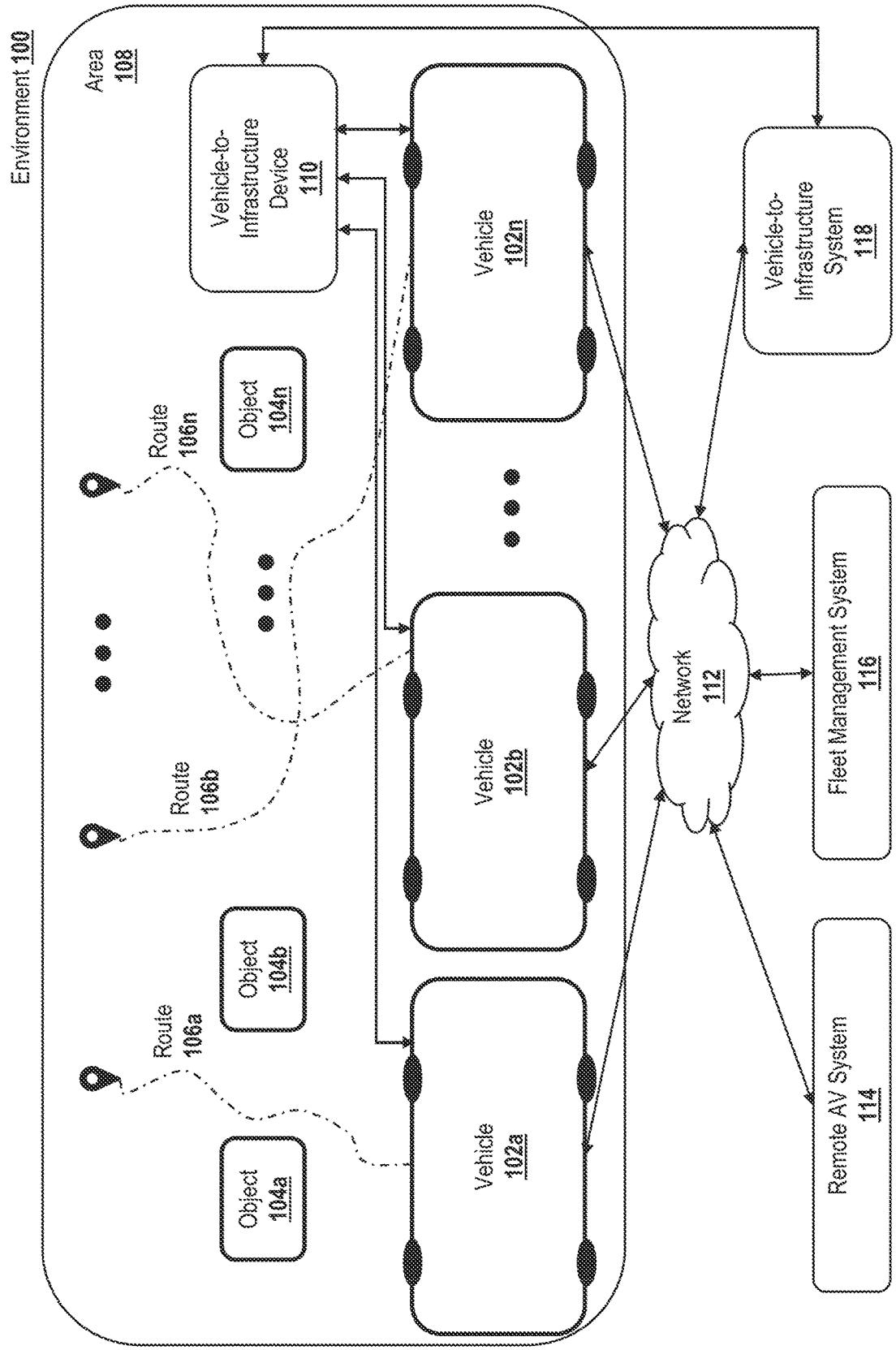
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit)

processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a deep learning based beam control system. Generally, a beam refers to a ray of light emitted by a light emitting device. In examples, a beam is a cone of light directed to a predetermined location. Examples of light emitting devices include headlamps, tail lights, daytime running lights, fog lights, signal lights, brake lights, hazard lights, driving lamps, and the like. For ease of description, the light emitting device according to the present techniques is described as a headlamp. However, any light emitting device that changes one or more states (e.g., illumination intensity) during operation can be used. Moreover, the present techniques are described as applying to beams of light output by headlamps. However, the present techniques apply to any emitted light, such as diffused lighting and ambient lighting.

A vehicle (such as an autonomous vehicle) includes one or more light emitting devices that illuminate the environment surrounding the vehicle. For example, headlamps are typically located at the front of a vehicle and produce beams of light that enable maximum visibility of the road ahead of the vehicle. The beams of light output by headlamps at the front of a vehicle are generally referred to as headlights. The intensity of beams emitted by the headlamps (e.g., headlights) can vary according to various environmental conditions. Sensor data is obtained from at least one sensor. Image features and object features are respectively extracted from the sensor data and detected objects of perception systems. The image features and the object features are fused and input to a beam classifier. Once trained, the beam classifier takes as input fused features associated with the environment and classifies a corresponding output beam of the headlamps as a high beam illumination intensity or low beam illumination intensity. In an example, the beam classifier is iteratively updated with additional incremental hard sample data obtained during real-time deployment of the beam classifier.

By virtue of the implementation of systems, methods, and computer program products described herein, techniques for a deep learning based beam control system enable a lightweight deep learning system for automatic beam illumination intensity control. The system according to the present techniques re-use data typically extracted for other autonomous vehicle operations, thereby reducing or eliminating the need for additional sensors and/or data collection to control the operation of the light emitting devices. Additionally, the present techniques are closed loop and enable continuous improvement to the deep learning model, without the need for manual annotation of training data. The present techniques ensure that the use of high beams or low beams during operation of an autonomous vehicle occurs as intended (e.g., as comports with vehicle traffic laws or local rules of the road), and that only rigorously tested software is used in deployment.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory)

connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
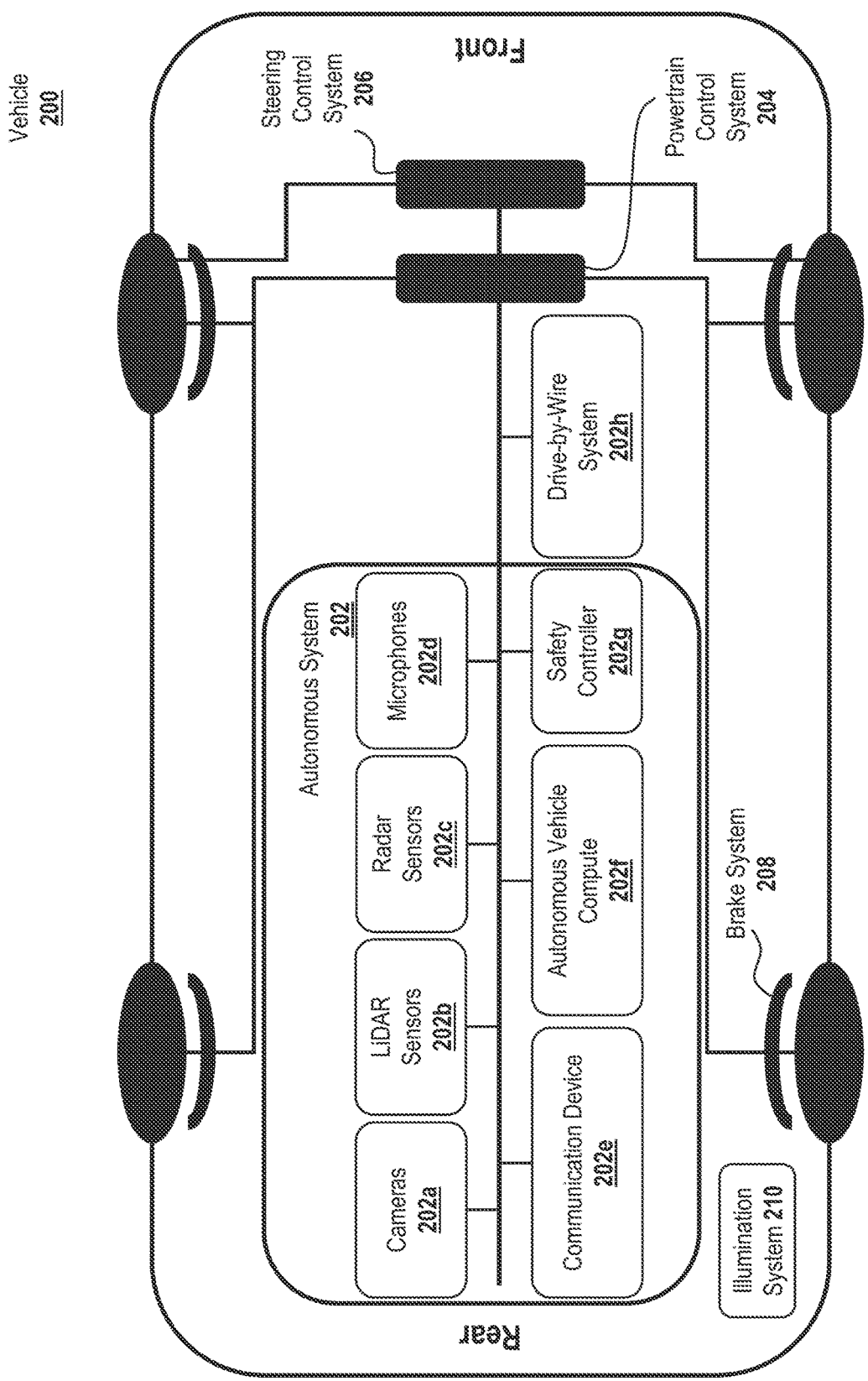
FIG. 2 is a diagram of one or more systems of a vehicle including an autonomous system.

Referring now to FIG. 2, vehicle 200 includes autonomous system 202, powertrain control system 204, steering control system 206, brake system 208, and illumination system 210. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
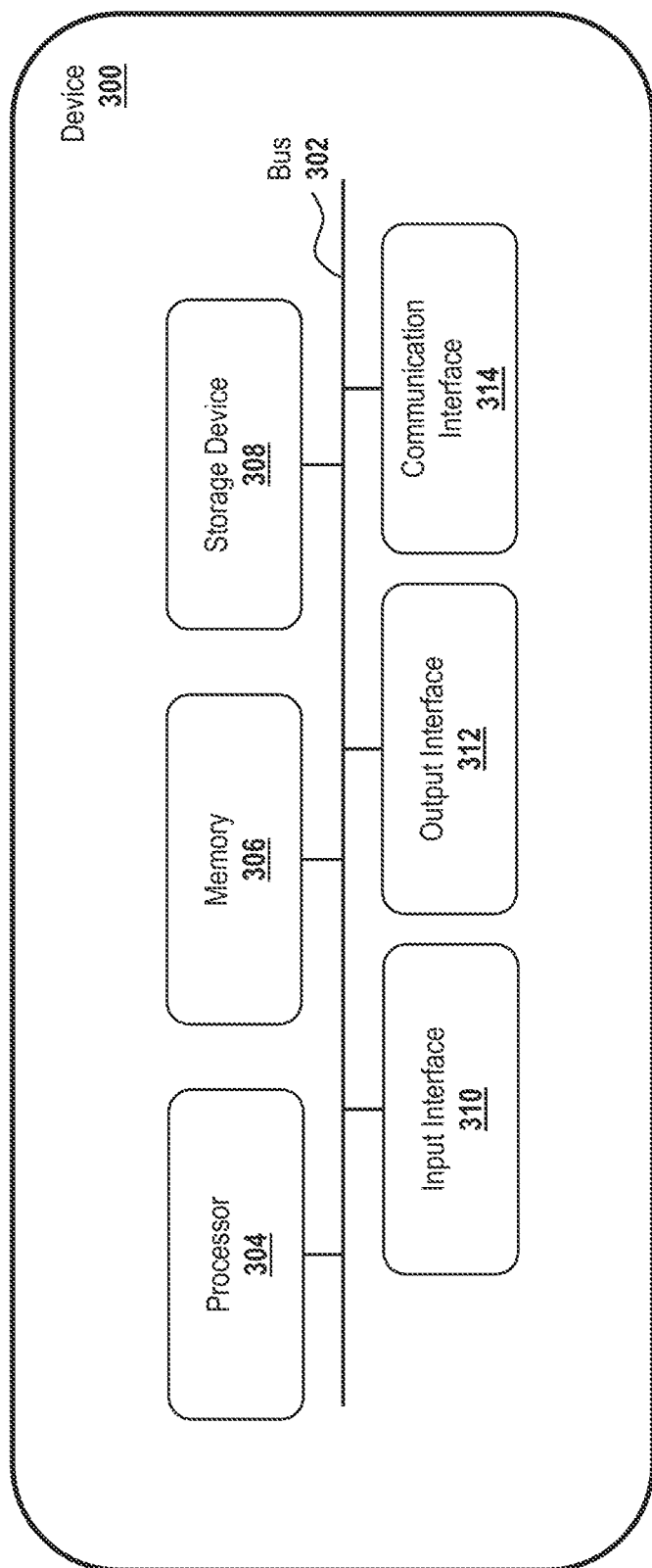
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

Illumination system 210 includes at least one light emitting device configured to output light. In some examples, illumination system 210 includes at least one controller and/or actuator that is configured to cause one or more light emitting devices of vehicle 200 to emit light at a at least one illumination intensity according to the present techniques. Additionally, or alternatively, in some examples illumination system 210 includes headlamps, tail lights, daytime running lights, fog lights, signal lights, brake lights, hazard lights, driving lamps, and/or the like. Illumination intensity generally refers to an amount of light output by the light emitting device. In examples, the illumination intensity is a number of lumens output by the light emitting device. Generally, a high beam illumination intensity outputs more light (e.g., a higher number of lumens) when compared to a low beam illumination intensity. The high beam illumination intensity and the low beam illumination intensity are collectively referred to as a beam control status. A beam control status refers to a state of the output of a light emitting device. In examples, the state of a light emitting device is relative to other states of the same light emitting device. In examples, the state of a light emitting device is relative to states of other light emitting devices.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of illumination system 210, and/or one or more devices of network 112 (e.g., one or more devices of a system of network 112). In some embodiments, one or more devices of vehicles 102 (e.g., one or more devices of a system of vehicles 102), one or more devices of illumination system 210, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
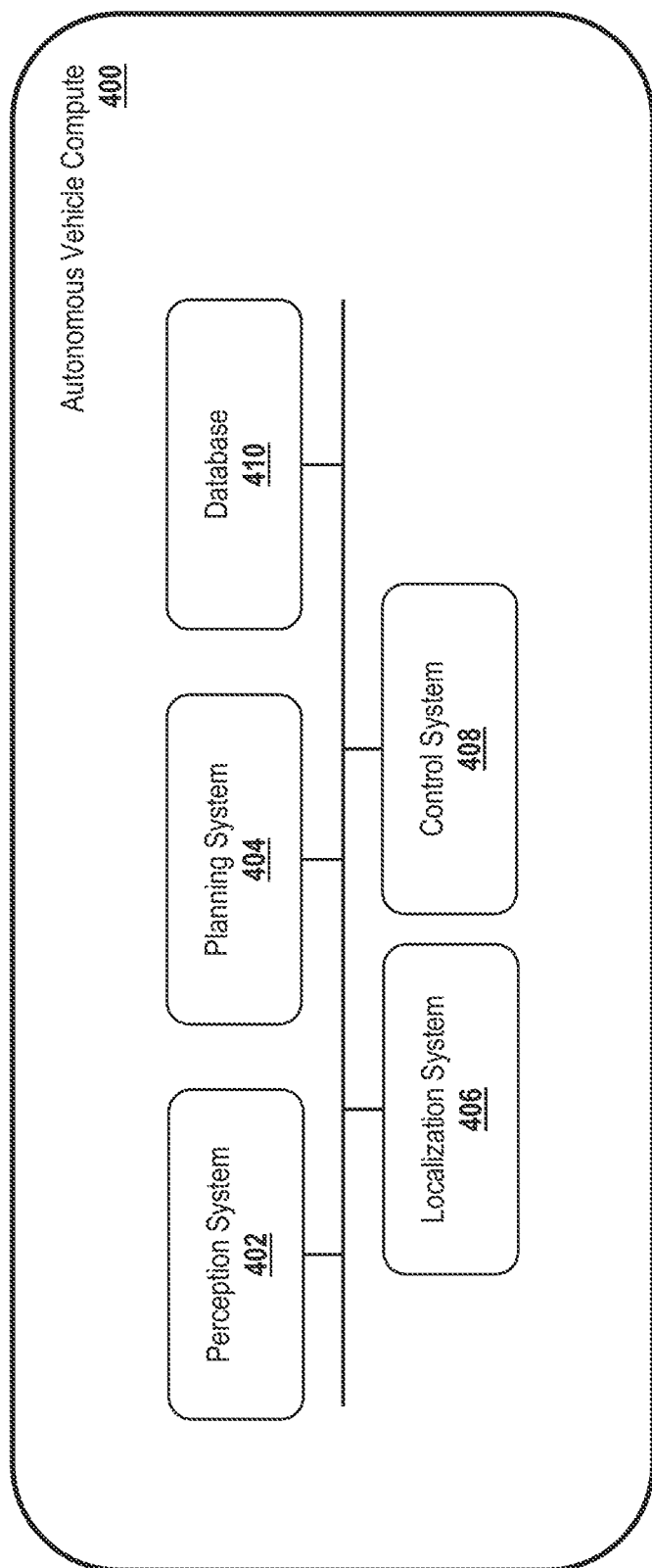
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), a brake system (e.g., brake system 208), and/or an illumination system (e.g., illumination system 210) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states. For example, when a change in environmental conditions occurs (e.g., as detected by of one or more sensors or devices of vehicle 200), control system 408 transmits a control signal to illumination system 210 to adjust an illumination intensity of a light emitting device of vehicle 200.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). For example, an illumination system (e.g., illumination system 210) can implement at least one machine learning model as part of a pipeline (e.g., a pipeline for identifying one or more illumination intensities within an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
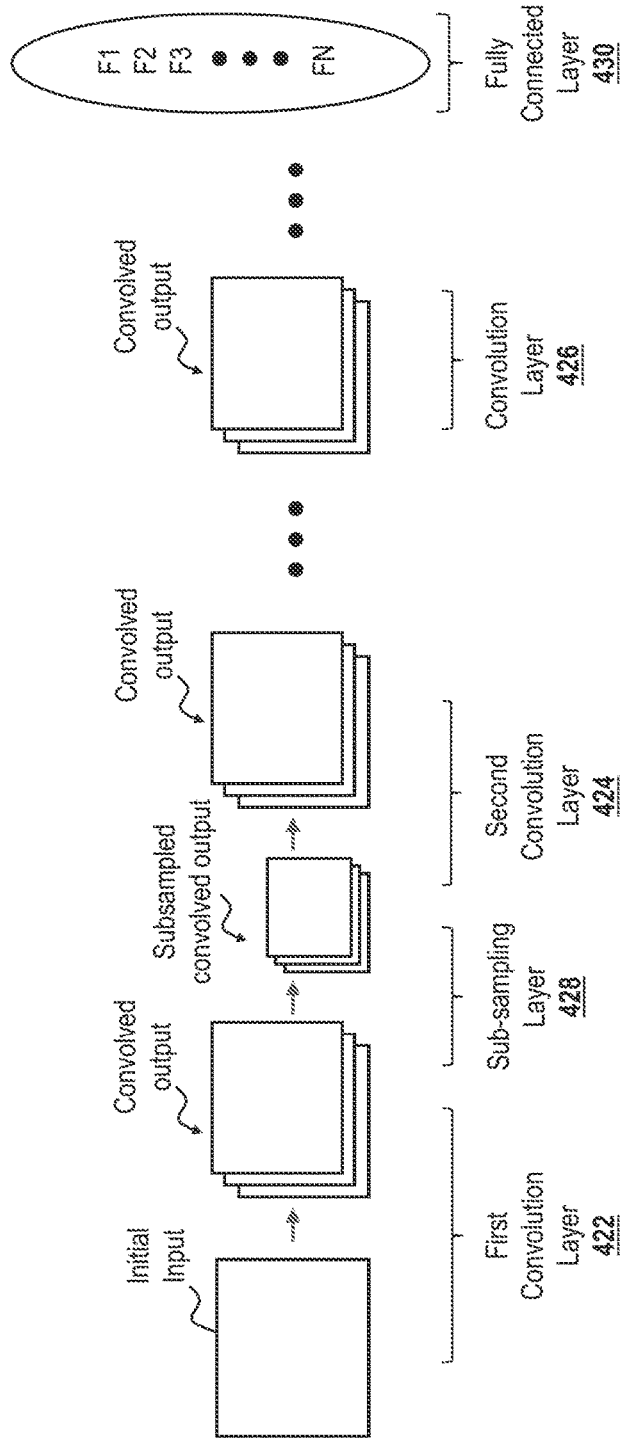
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
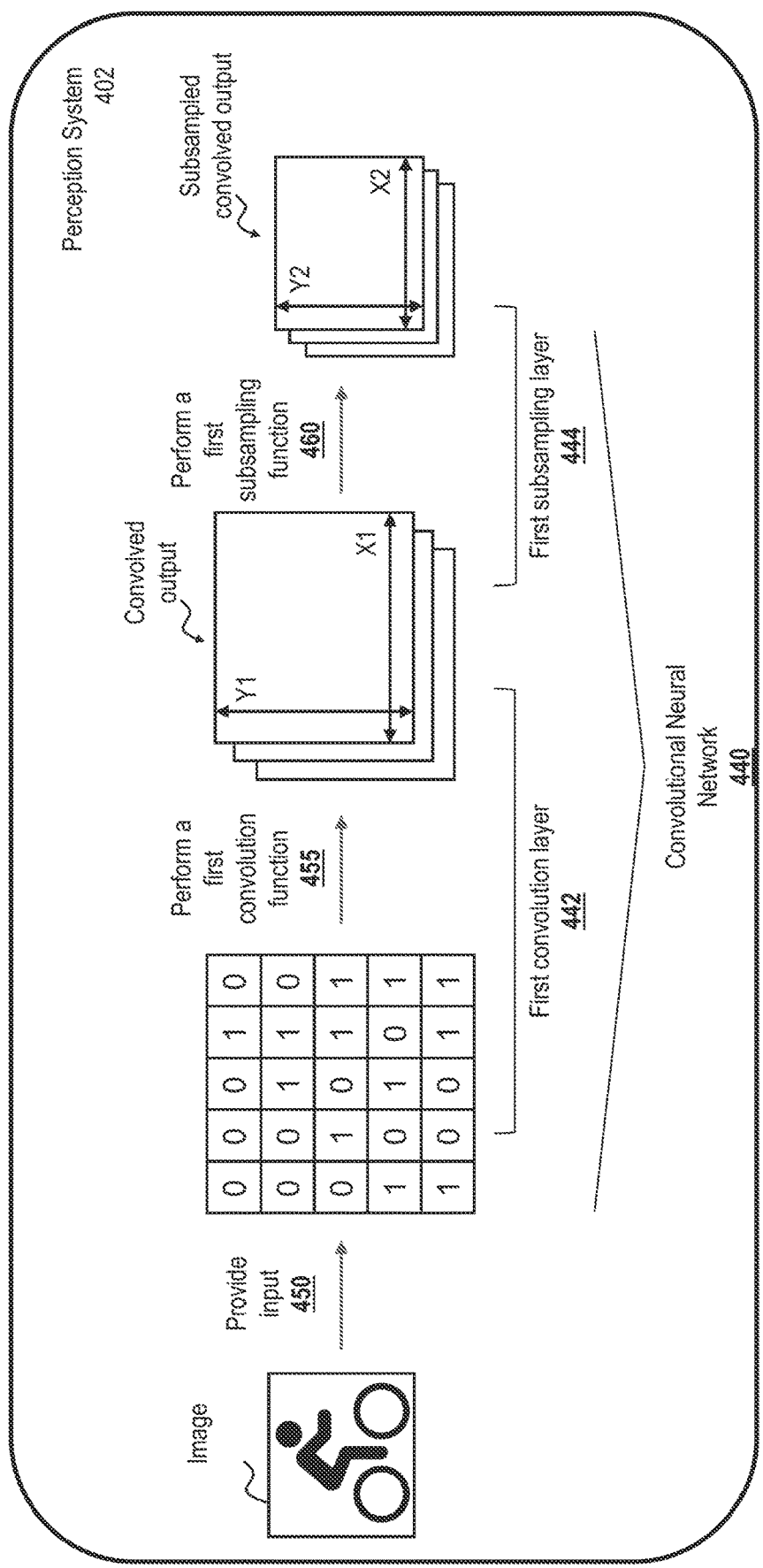
FIGS. 4C and 4D are a diagram illustrating example operation of a CNN.
Figure 4D:
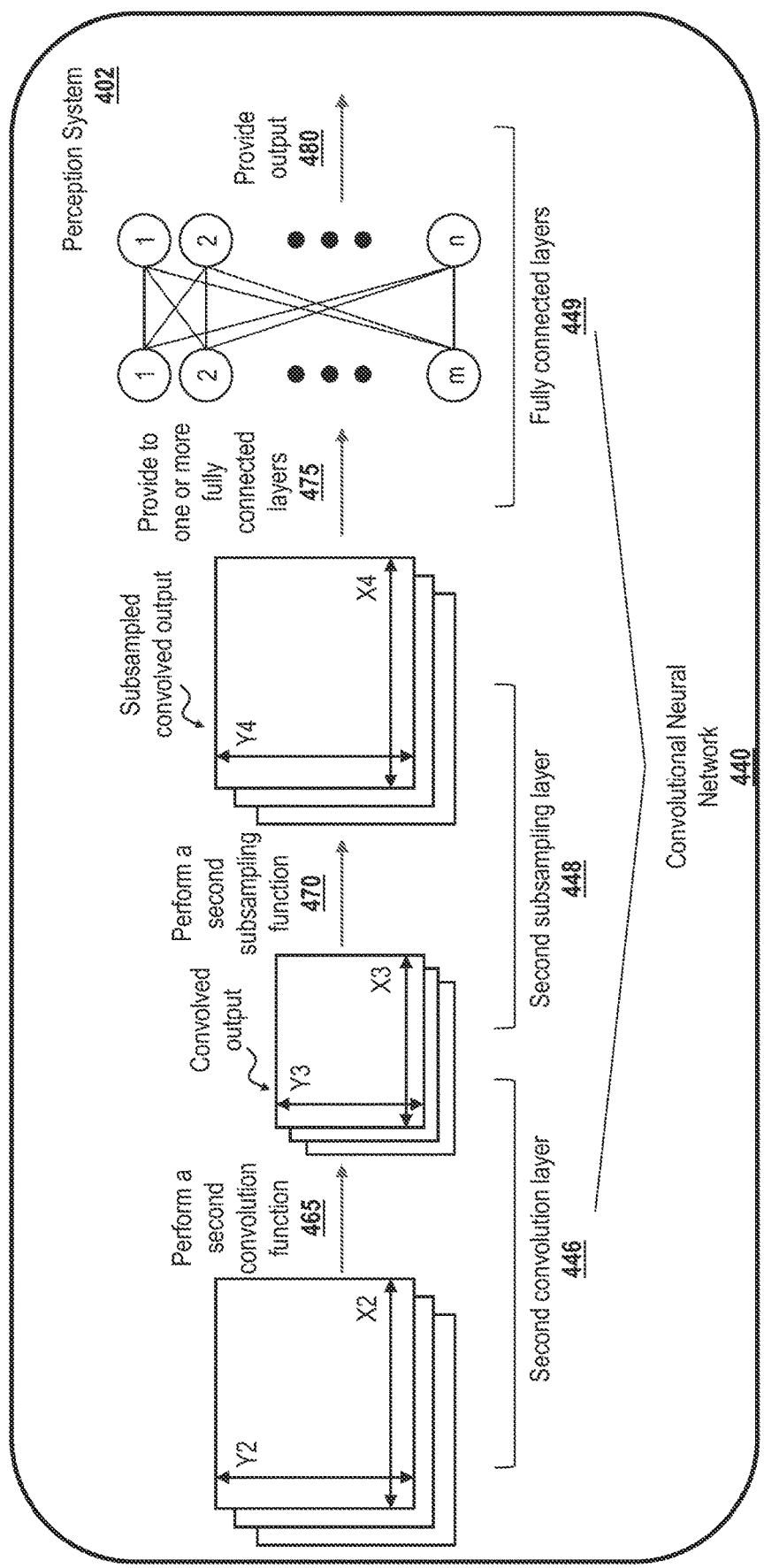

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like. Further, the data associated with the image includes lighting conditions of the environment and objects identified in the environment.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5:
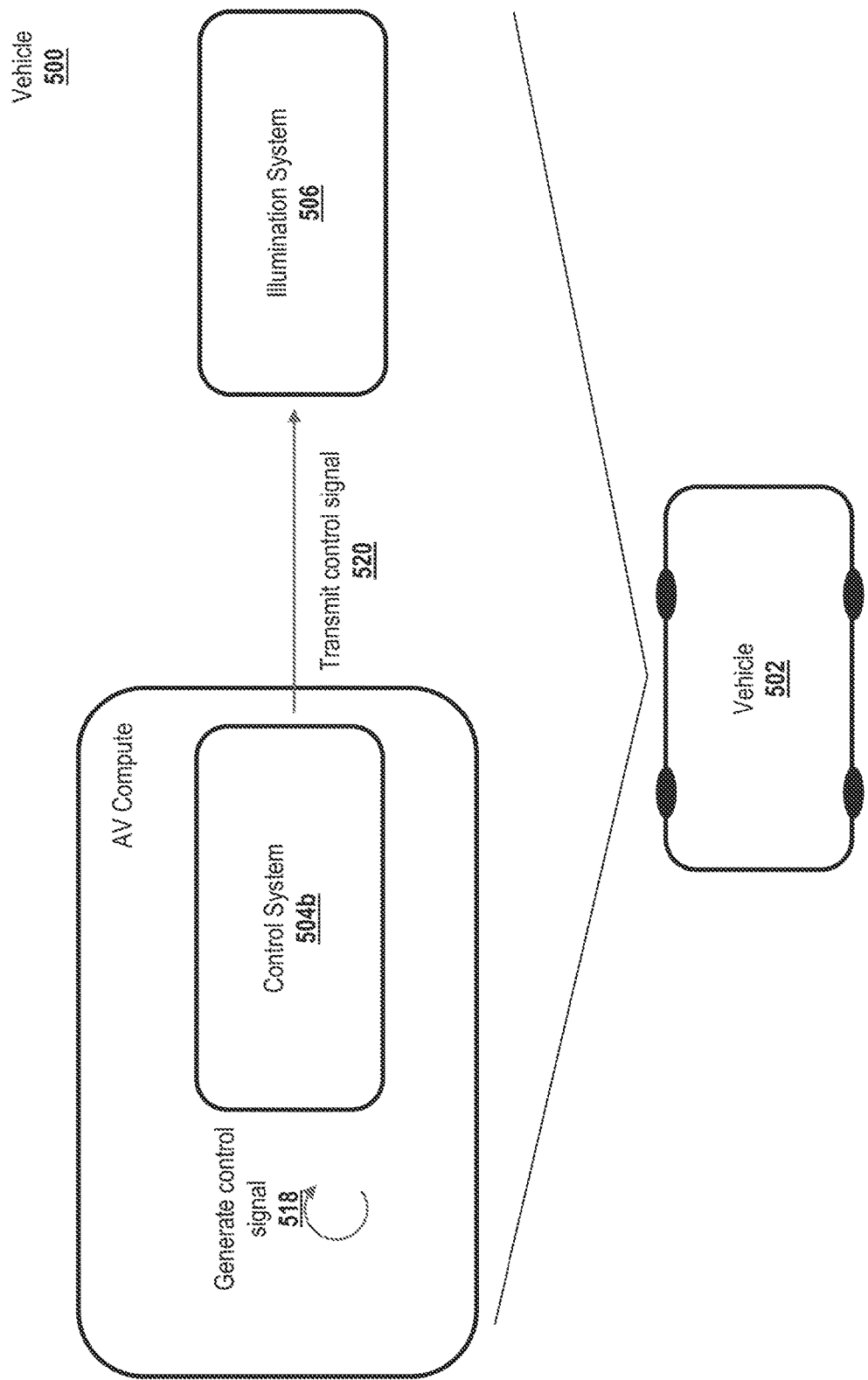
FIG. 5 is an illustration of an implementation of a process for a deep learning based beam control system.

Referring now to FIG. 5, illustrated are diagrams of an implementation 500 of a process for a deep learning based beam control system. In some embodiments, implementation 500 includes control system 504b and an illumination system 506. In some embodiments, illumination system 506 is the same as or similar to illumination system 210 (FIG. 2).

In an embodiment, control system 504b transmits a control signal 520 to Illumination system 506 that causes at least one light emitting device to modify an illumination intensity. The light emitting device is, for example, a headlamp, tail light, daytime running light, fog light, signal light, brake light, hazard light, driving lamp, or any combinations thereof. In embodiments, an illumination intensity is based on, at least in part, fused feature data that represents real-time environmental conditions, including objects in the environment.

In an embodiment, detected road objects (i.e., includes data such as object type, position, size, heading orientation) within the surrounding environment are obtained from the output of perception system 402 (FIG. 4A) of an autonomous vehicle. Meanwhile, corresponding map information (i.e. distance between the detected road object location to the drivable road ahead, the information is important to decide the high beam illumination intensity) associated with the detected road objects is extracted via a localization system 406 and database 410 (FIG. 4A). An object feature network is applied to learn features that correlate to high beam illumination intensity from these detected road objects and their map information. Image features are extracted from the sensor data to identify environmental conditions using an image feature network. The image features include, for example, the surrounding lighting conditions that closely correlate to high beam illumination intensity. A second portion of the sensor data is input to the image feature network and the image feature network outputs an image feature vector comprising at least illumination data associated with at least one pixel. The object feature vector and the image feature vector are fused into at least one fused feature vector via a feature fusion network that takes as input the object feature vector and the image feature vector, and outputs a fused feature vector. The fused feature vector is classified as associated with a high beam illumination intensity or a low beam illumination intensity of a light emitting device. A control circuit is configured to operate at least one light emitting device based on a classification of the fused feature vector.

The present techniques include systems and algorithms that provide illumination intensity control of a light emitting device. In examples, the light emitting device is a component of an autonomous vehicle. Generally, autonomous vehicles operate without input from humans. For example, an autonomous vehicle can navigate roadways using internal systems, such as an autonomous system 202 of FIG. 2. For example, the autonomous system 202 can include an illumination system 210 with one or more light emitting devices.

The present techniques are generally applicable to any light emitting device of an autonomous vehicle. For example, the light emitting devices include headlamps, tail lights, daytime running lights, fog lights, signal lights, brake lights, hazard lights, driving lamps, and the like. For ease of description, the light emitting device is described as a headlamp. However, any light emitting device that changes one or more conditions (e.g., illumination intensity) during operation can be used.

In typical operation of a vehicle, human drivers manually alternate between high beam illumination intensity and low beam illumination intensity in response to various environmental conditions while driving. For example, while driving on the road at night a human driver alternates between a high beam illumination intensity and a low beam illumination intensity in response to varied lighting conditions encountered in the environment. The present techniques enable autonomous vehicles to determine the illumination intensities output by light emitting devices of the autonomous vehicle as the vehicle navigates roads, especially at night or under poor lighting conditions, in real-time. The present techniques include a closed loop, annotation free, illumination intensity control based on a convolutional neural network that learns from manual driving data. In particular, the present techniques include a beam illumination intensity control deep neural network that predicts a beam illumination intensity based on image data and perception detected objects. In this manner, the present techniques avoid manual annotation of ground truth data.

Figure 6:
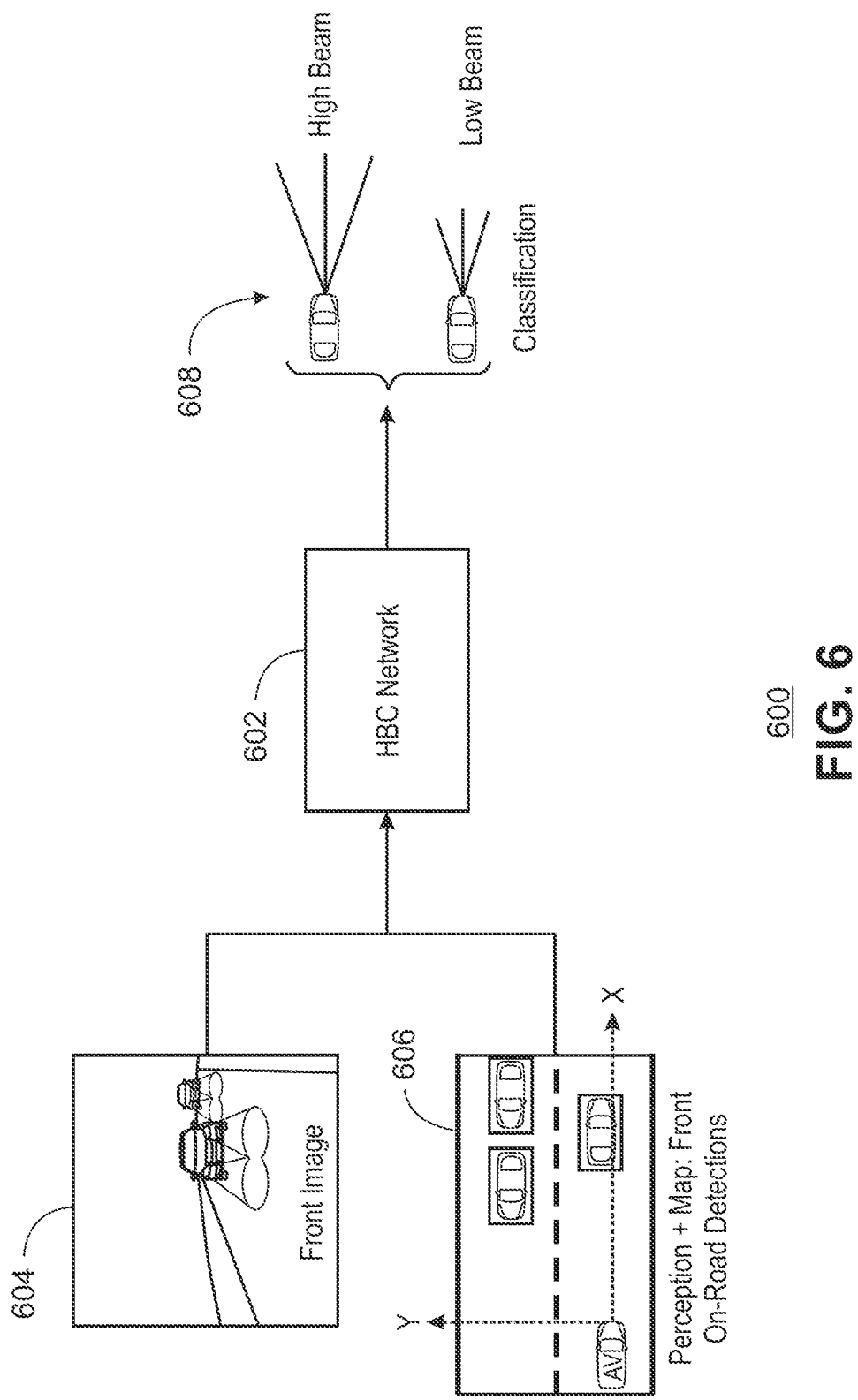
FIG. 6 is a diagram of a beam illumination intensity control system.

FIG. 6 is a diagram of a beam illumination intensity control system 600. The system 600 includes a beam control network 602. The beam control network is, for example, a convolutional neural network (e.g., CNN 420 of FIG. 4B). Inputs to the beam control network 602 include data associated with one or more images 604 and data associated with objects (e.g., perception output data) 606. The beam control network 602 outputs a beam illumination intensity classification 608. In particular, based on the input images 604 and perception output data 606, the beam control network 602 classifies the environmental conditions represented by the images 604 and perception output data 606 into a high beam illumination intensity output by headlamps of the vehicle or a low beam illumination intensity output by headlamps of the vehicle.

When driving at night, human drivers alternate between low beam illumination intensities or high beam illumination intensities of a vehicle's headlamp to balance between having increased visibility along the direction of travel and avoid interference to other road users. For example, manual driving data (e.g., data captured while a human driver operates the vehicle) includes a selection of a low beam illumination intensity when approaching another vehicle from behind, when encountering an oncoming vehicle along a road, and on well-lit roads. Additionally, manual driving data includes a selection of a high beam illumination intensity when traveling on poorly lit roads or when no other vehicles are subject to interference or blinding from the high beam illumination intensity. In examples, the manual driving data is collected with a human driving beam control signal as the ground truth. The present techniques enable automatic selection of an illumination intensity based on image features and object features detected in the environment.

In the example of FIG. 6, image features are extracted from front camera images 604. Generally, an image feature encodes illumination and environment information. In the example of FIG. 6, object features are extracted from perception output data 606. Generally, an object feature encodes road user information. In embodiments, the object features are detected in areas of the environment within an illumination range of the light emitting device. In the example of a headlamp, the object features are determined for perception detected objects in a direction of travel of the vehicle. In embodiments, the object features are associated with a map prior. The map prior of an autonomous system at least contains road network information that is used to extract a distance to the drivable road for each detected road object given the detected road object position, size, and heading orientation. In examples, the object feature network takes as input the road object distance to drivable road to learn features. The map prior provides additional information associated with detected road objects. The additional information is used to determine the importance of a detected road object to autonomous driving and beam control. For example, a detected pedestrian or vehicle that is far away from the driving path is less important compared with a vehicle in the driving path of the Autonomous vehicle when determining to output a high beam illumination intensity or a low beam illumination intensity. While the map prior provides additional information, the object feature network is able to learn features that correlate to a beam control status from the detected road objects without map information. Generally, the image features and object features are fused and input to a beam control network.

Figure 7:
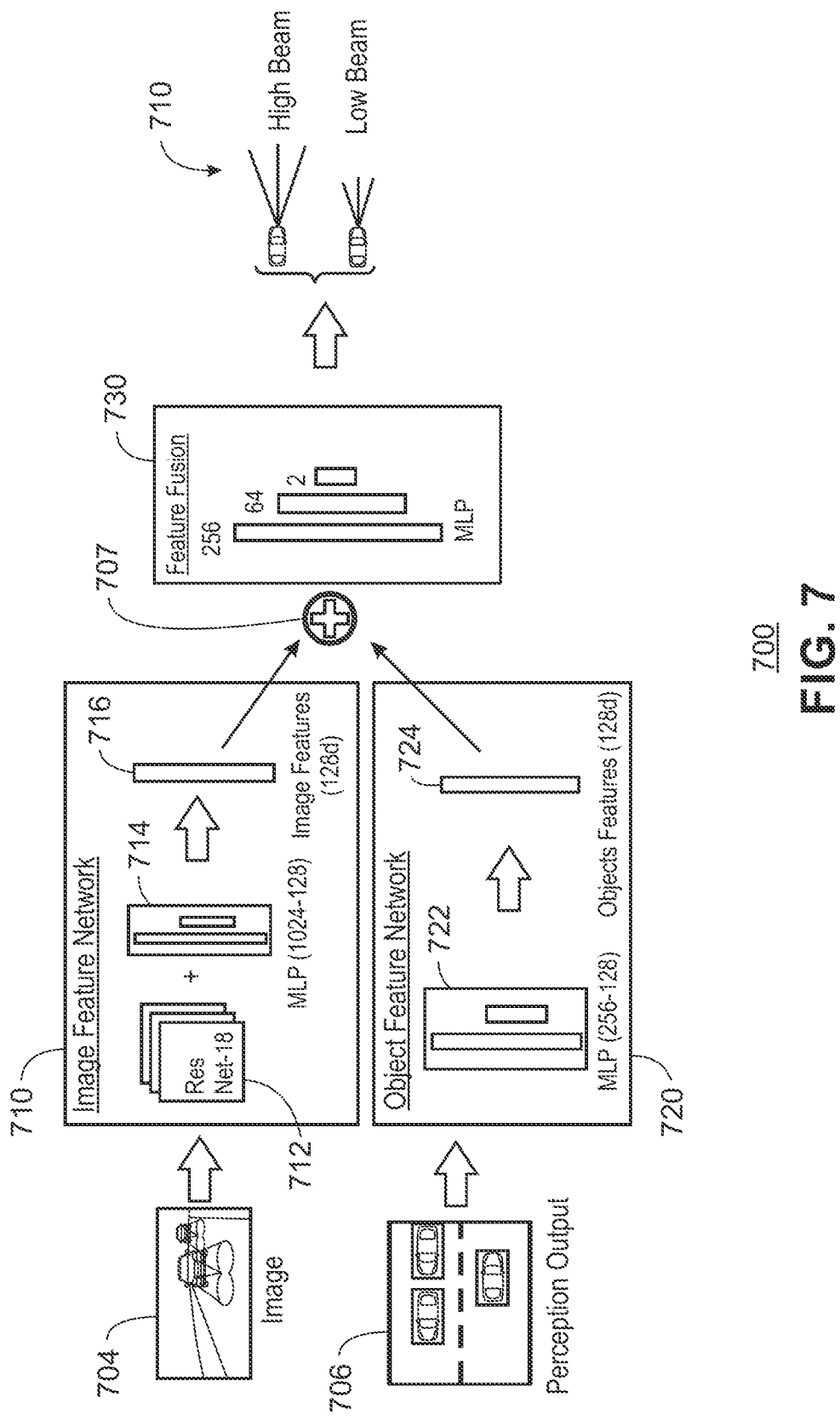
FIG. 7 is an illustration of a beam control network.

FIG. 7 is an illustration of a beam control network 700. The beam control network consists of three components: an image feature network 710, an object feature network 720, and a feature fusion network 730. In embodiments, the feature fusion network 730 enables a classification of the fused features learnt from input sensor data and perception output as associated with a high beam illumination intensity or a low beam illumination intensity. The classification is a prediction of a beam control status of a light emitting device.

In the example of FIG. 7, the image feature network 710 is a CNN (e.g., CNN 420 of FIG. 4) with a multilayer perceptron. As illustrated, the image feature network 710 includes ResNet-18 712. The ResNet-18 712 is a CNN that is 18 layers deep, including a first convolutional layer and a final fully-connected layer. The ResNet-18 712 extracts image features from the image data 702. Initially, ResNet-18 712 is trained using an initial dataset as described with respect to FIG. 8. For ease of illustration, the beam control network 700 is illustrated with the image feature network 710, object feature network 720, and feature fusion network 730 as separate component networks. In embodiments, the complete beam control network 700 executes in real-time with the image feature network 710 and object feature network 720 operating in parallel, and transmitting parallelized output to the feature fusion network 730. Accordingly, the ResNet-18 712 is applied to sensor data in real time. Real time execution of the beam control network 700 enables the autonomous vehicle to respond immediately (e.g., with minimal interruptions, similar to the speed of a human response) to changes in conditions and determine whether a high beam illumination intensity or low beam illumination intensity is appropriate according to an input image from a camera system and detected objects from perception systems. In embodiments, real time performance enables the autonomous vehicle to respond promptly by switching to an optimal beam control status without delay. Additionally, in embodiments the beam control network 700 enables increased performance by the perception system in detecting road objects by providing lighting according to the beam control status.

Generally, lighting conditions of the environment are derived from camera image data 704. In embodiments, the image data 704 includes data associated with an illumination of the environment. Comparison of the data associated with an illumination of the environment at a plurality of timestamps provides an indicator to the beam control network that lighting conditions have changed. Accordingly, in embodiments the images 704 are input to ResNet-18 712, and changes in lighting conditions cause changes in the image features extracted by ResNet-18 712.

In embodiments, the output of ResNet-18 712 is one or more image features, in the form of a feature vector. For example, the image feature output by ResNet-18 is a 1024-dimension (d) vector. The large image feature vector output by ResNet-18 712 is input to a multilayer perceptron 714. Generally, the multilayer perceptron 714 is a feed-forward network that includes one or more fully connected layers. In examples, the last two layers of ResNet-18 712, including the fully connected layer and softmax layer, are replaced by the multilayer perceptron 714. The input image is resized to 112×112 to learn the features that represent the overall environment conditions, especially the lighting conditions that correlate to a high beam illumination intensity. Accordingly, the multilayer perceptron 714 reduces the dimensionality of the large scale image feature vector (1024d) output by ResNet-18 712. In examples, dimensionality reduction extracts one or more significant features from large-scale data in a high dimensional space. The output of the multilayer perceptron 714 is an image feature vector 716 with a size of 128d.

In the example of FIG. 7, the object feature network 720 includes multilayer perceptron 722. In embodiments, the multilayer perceptron 722 takes as input perception output 706 from a perception system 900 described with respect to FIG. 9. The multilayer perceptron 722 reduces the dimensionality of the object feature vector (256d) output by perception output 706, where the dimensionality reduction extracts one or more significant features from the perception output 706. The output of the multilayer perceptron 722 is an object feature vector 724 with a size of 128d. In the example of FIG. 7, perception and map data (e.g., perception output 706) is used to determine how close the autonomous vehicle is to other objects, including vehicles also traveling on a road. In an embodiment, the distance between the autonomous vehicle and another vehicle or object governs the appropriate illumination intensity output by a light emitting device of the vehicle.

The image feature vector 716 and the object feature vector 724 are concatenated at concatenator 707 to form a concatenated image-object feature vector of size 256d. The concatenated image-object feature vector is input to the feature fusion network 730. At the feature fusion network 730, the concatenated image-object feature vector is fused and the dimensionality of the data reduced to obtain a classification 708 of environmental conditions as being associated with a high beam illumination intensity or a low beam illumination intensity. In embodiments, a multilayer perceptron fuses and simultaneously reduces dimensions of the concatenated image-object feature vector. The 128d image feature vector and 128d object feature vector are concatenated together at concatenator (707) to obtain a 256d feature vector. At the feature fusion network 730, the concatenated 256d feature vector is input into three multilayer perceptron layers with 256, 64, and 2 output channels. Accordingly, in embodiments the output of the feature fusion network 730 is a two-dimensional vector that provides information for the high/lower beam probability. The trained beam control network 700, including a trained image feature network 710, a trained object feature network 720, and a trained fused feature network 730, is operable to classify sensor data into a high beam illumination intensity or a low beam illumination intensity. In embodiments, the beam control network 700 is iteratively trained based on the availability of training data.

Figure 8:
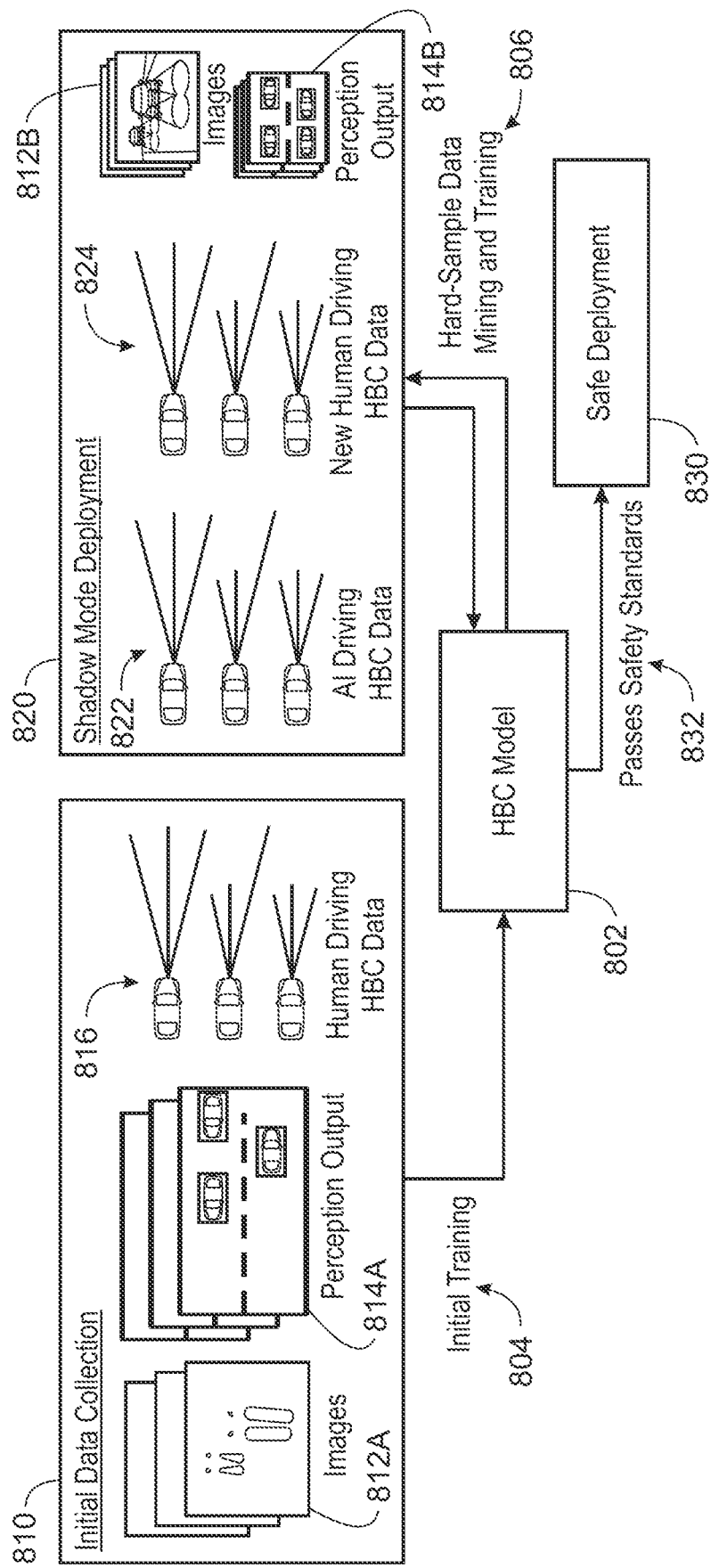
FIG. 8 is a block diagram of a system for training and deploying a beam control network.

FIG. 8 is a block diagram of a system 800 for training and deploying a beam control network 802. In the example of FIG. 8, initial data collection is illustrated at reference number 810. Shadow mode deployment of a trained beam control network 802 is illustrated at reference number 820. The initial data collection illustrated at reference number 810 generates a training dataset used to train the beam control network 802 during initial training 804. Shadow mode deployment at reference number 820 enables hard-sample data mining and training 806. The initially trained beam control network 802 is iteratively trained using hard-sample data created during shadow mode deployment at reference number 820. The beam control network 802 is made available for safe deployment 830 after one or more safety standards 832 have been satisfied.

In examples, initial data collection includes images 812A, perception output 814A, and manual driving beam control data 816. In embodiments, the images 812A, perception output 814A, and manual driving beam control data 816 form a training dataset. The beam control network 802 is initially trained using a first training dataset that includes images 812A, perception output 814A, and manual driving beam control data 816. In examples, the images 812A are front facing camera images that are captured along a direction of travel of the vehicle. Generally, the image data is captured by one or more imaging sensors, and imaging data quantifies an illumination of the captured pixels. Generally, the illumination of the image data represents a luminous flux of visible light received from the environment per unit area. In examples, the magnitude of the illumination is characterized by an illuminance value.

Generally, perception output 814A refers to the output of a perception system (e.g., perception system 402). The perception output 814A is the input to the object feature network 720 as described with respect to FIG. 7. In examples, the perception output 814A is the perception output 706 described with respect to FIG. 7. Additionally, in examples, the output of the perception system 814A is a list of detected objects, each object associated with an object category and bounding box (including center position, size and heading orientation). The perception output 814A is determined by a perception system, which uses one or many kinds of raw sensor data, including camera, LiDAR and RADAR, to detect the objects. In some cases, different perception systems may different sensor data and fuse data of different sensors at different stages. In embodiments, detectors, i.e. image object detector, LiDAR object detector, and RADAR object detector, apply a CNN to detect objects, with cross-sensor fusion occurring at different stages. For example, late fusion perception systems fuse the detected objects output from different sensor pipelines. Some perception systems fuse the image, LiDAR and RADAR data at the detection network features.

Figure 9:
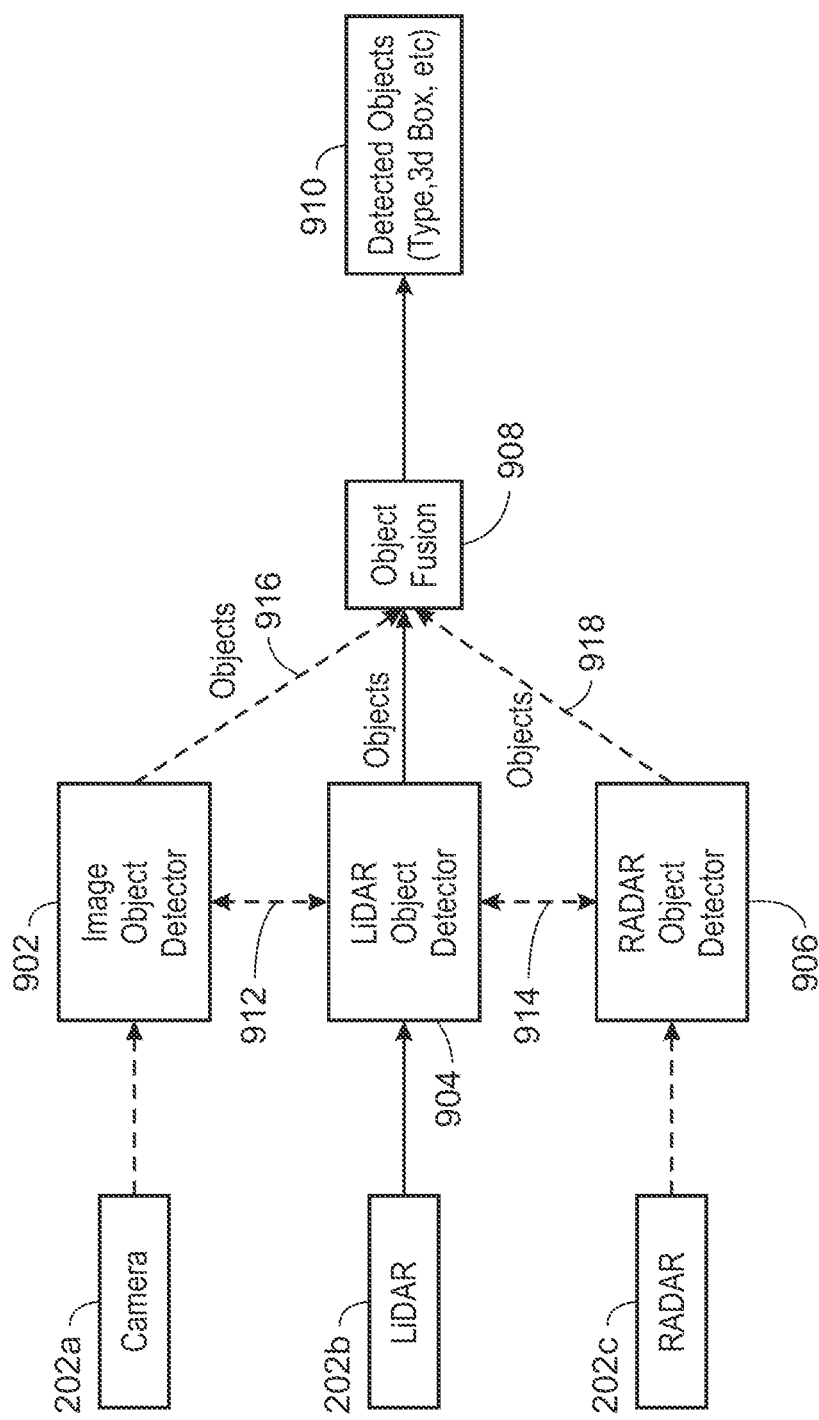
FIG. 9 is a block diagram of a perception model.

FIG. 9 is a block diagram of a perception system 900. The perception system includes raw sensor data inputs, including camera 202a, LiDAR 202b, and RADAR 202c sensors. The sensors output raw data that is input to a respective detector. Thus, raw sensor data from the camera 202a is input to an image object detector 902. Raw sensor data from the LiDAR 202b is input to a LiDAR object detector 904, and raw sensor data from the camera RADAR 202C is input to a RADAR object detector 906. The detectors 902, 904, and 906 detect the objects using each respective raw sensor data. In some cases, the objects detected by the detectors 902, 904, and 906 are associated with intermediate features. The detected objects are fused to eliminate redundant or false objects at object fusion 908. The object fusion 908 outputs detected objects 910. The detected objects are identified by an object type and one or more three-dimensional bounding boxes. In embodiments, the intermediate features associated with objects detected by the detectors 902, 904, and 906 are fused independently as illustrated by the dashed lines 912, 914, 916, and 918. In examples, the LiDAR 202b is the primary sensor to detect objects. In the example of FIG. 9, alternative perception systems are illustrated by the dashed lines 912, 914, and 918. The dashed line 912 illustrates fusion between the features output by the image object detector 902 and features output by the LiDAR object detector 904. Similarly, the dashed line 914 illustrates fusion between features output by the LiDAR object detector 904 and feature output by the radar object detector 906. Dashed line 916 and dashed line 918 illustrate fusion from the detected objects output by the image object detector 902 and the radar object detector 906, respectively, with detected objects from the LiDAR object detector 904. The perception output of detected objects 910 is used as the input of the object features network 706 (FIG. 7).

In the example of FIG. 9, the detected objects 910 are associated with one or more bounding boxes, a position of the one or more bounding boxes, a classification of an object associated with one or more bounding boxes. In embodiments, the classification is a probability of the object being classified as a particular object. Further, each bounding box is defined by a size (w, l, h) associated with the corresponding object, a location (x, y, z) associated with the corresponding object, and a heading orientation associated with the corresponding object. In examples, the bounding box defines a front view and a dimension of the object. The output of the perception model 900 is a fixed length vector with data that indicates a classification, position, ground view dimension, and heading orientation of one or more objects. In embodiments, map data is used to obtain localization data associated with the objects. For example, a beam illumination intensity change based on if the object is located on the road or off the road based on localization data. In particular, a high beam illumination intensity is output while the autonomous vehicle is within a threshold distance of an off-road vehicle. A low beam illumination intensity is output while the autonomous vehicle is within the threshold distance of an on-road vehicle. Generally, the list of objects output by the perception model 900 are located within the threshold distance of the vehicle. Objects within the threshold distance of the vehicle can form a cluster of vehicles. The threshold distance may be, for example, objects within two meters of the planned travel path. In examples, objects in the cluster are a predetermined distance away from the curb or other edge of a road.

Referring again to FIG. 8, the initial training data collection at reference number 810 also includes manual driving beam control data 816. In embodiments, the manual beam control driving data 816 is data associated with the selection of an illumination intensity during driving by a human. In the example of FIG. 8, the beam control network model 802 is initially trained using images 812A, perception output 814A, and human driving beam control data 816.

After the initial training at reference number 804, the trained beam control network is deployed in shadow mode at reference number 820. Generally, shadow mode refers to the operation of the trained beam control network 802 while the vehicle is controlled by a human driver. Accordingly, in embodiments shadow mode is the simultaneous execution of the trained beam control network and operation of the vehicle by a human driver. During this shadow mode, the output 822 of the trained beam control model is compared to manual driving data 824 generated by the human driver. Images 812B and perception output 814B is also captured. Instances where the trained beam control network output 822 conflicts with the manual driving data 824 are extracted and mined as hard sample data. In embodiments, the hard sample data includes the conflicting trained beam control network output 822 and manual driving data 824, corresponding images 812B, and corresponding perception output 814B. In examples, corresponding images 812B and perception output 814B are captured at a same timestamp of the conflicting trained beam control network output 822 and manual driving data 824. Additionally, in examples corresponding images 812B and perception output 814B are captured within a predetermined time range of a timestamp of the conflicting trained beam control network output 822 and manual driving data 824.

The beam control network 802 is fine-tuned with the incrementally collected hard sample data and existing database. In particular, the hard sample data is used to update one or more weights of the beam control network. In examples, fine-tuning refers to modifying weights of the beam control network by re-training the beam control network on the hard sample data. In examples, the hard sample data is data with a low occurrence frequency or long-tail corner case data. During fine tuning, a few of the top layers of a frozen beam control network are unfroze, and newly-added classifier layers and the last layers of the beam control network are jointly trained. This enables a fine-tuning of higher-order feature representations in the beam control network in order to make them more relevant to beam control. In embodiments, the weights are updated by inputting the images 812B and perception output 814B corresponding to the conflict between trained beam control network output 822 and human driving data 824 for training. The hard sample data mining and training 806 creates a closed loop system with feedback that enables automatic and continuous system improvement as hard sample data becomes available. Generally, safety standards 832 are used to analyze the beam control network 802. Once the one or more safety standards 832 are satisfied, the beam control network 802 is safely deployed in production mode at block 830.

Figure 10:
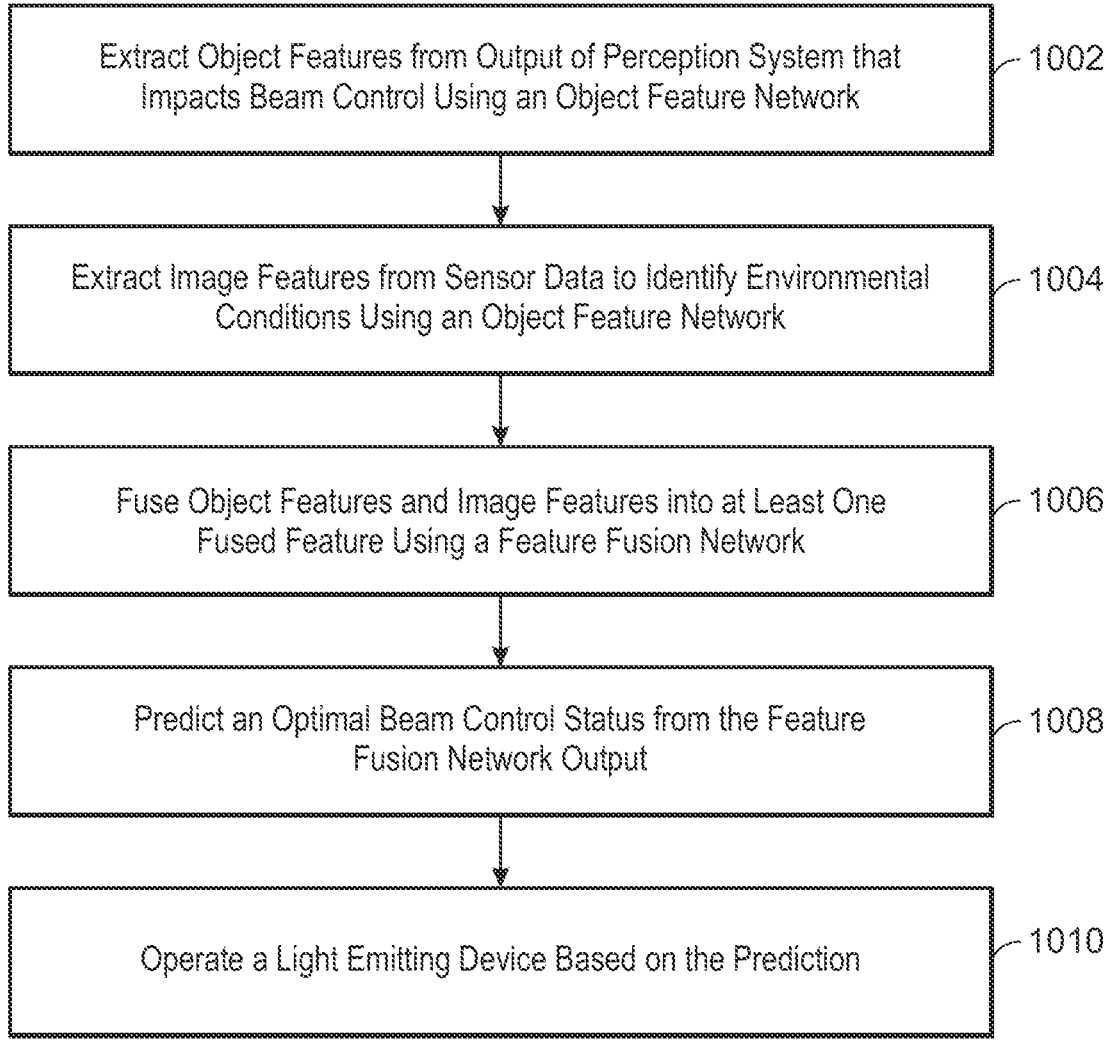
FIG. 10 is a block diagram of a process for a deep learning based beam control system.

FIG. 10 is a block diagram of a process 1000 for a deep learning based beam control system. At block 1002, object features are extracted from the output of a perception system. The object features are extracted using an object feature network. In embodiments, detected objects (including object type, position, size and heading orientation for each object) from a perception system are the input to the object feature network, and the object feature network outputs an object feature vector that implicitly characterizes the detected road objects that correlate to beam control.

At block 1004, image features are extracted from the sensor data to identify environmental conditions (e.g., illumination) using an image feature network. In embodiments, the image features include illumination information (brightness or lack thereof), environmental information (image information of objects), or any combinations thereof. In embodiments, the image feature network outputs an image feature vector comprising at least illumination data associated with the sensor data. In examples, the output of the image feature network is a feature vector that implicitly characterizes the environmental illumination information.

At block 1006, the object features and the image features are fused. In embodiments, the fusion is feature level data fusion, where the feature vectors are concatenated. The concatenated 256d features are then fed into a feature fusion network that includes three multilayer perceptron layers with 256, 64 and 2 output channels, respectively. At block 1008, the fused feature is classified as associated with a high beam illumination intensity or a low beam illumination intensity of a light emitting device (e.g. headlamp, any other lights used for visibility). The output of the last layer of the multilayer perceptron of the feature fusion network is a vector of size 2d that includes a probabilities of an output of the light emitting device being a high beam illumination intensity or a low beam illumination intensity. In embodiments, the classification of high/low beam is simply applied by checking which value is greater between the two values in the 2d output of the last multilayer perceptron layer of the feature fusion network. At block 1010, the light emitting device is operated based upon the classification of the fused feature.

The beam control network according to the present techniques is a lightweight learning framework for automatic beam control. The ability to control beam illumination intensity autonomously increases the operational domain of the autonomous vehicle. Additionally, the closed loop techniques according to the present techniques enable continuous improvement of the deep learning beam control network without relying on manual annotation as input to the model. This enables faster and cheaper development of the deep learning beam control network. The procedure ensures that the necessary safety risks are not incurred, and only deploying software that is rigorously tested. Generally, the beam control network is a light network that can be run in real-time on top of the existing AV system. In embodiments, the object features and image features can be used to train a similar networks for AV systems associated with human driving expertise data during the operation of a vehicle. In examples, the human driving expertise data is automatically captured during human operation of a vehicle. For example, the object features and image features can train an automatic horn control network and automatic emergency braking control network.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system, comprising:
   at least one processor; and
   at least one memory storing instructions thereon that, when executed by the at least one processor, cause the at least one processor to:
   extract object features from a perception system output to identify objects in an environment using an object feature network, wherein the object feature network outputs object features associated with a map prior used to extract a distance associated with the objects, wherein the distance governs an illumination intensity output by a light emitting device;
   extract image features from sensor data to identify environmental illumination information using an image feature network, wherein the image feature network outputs image features that comprise environmental information and data associated with an illumination of the environment;
   fuse the object features and the image features into fused features using a feature fusion network that takes as input the object features and the image features and outputs fused features;
   predict a beam control status according to the fused features, wherein the beam control status indicates a high beam illumination intensity or a low beam illumination intensity of the light emitting device; and
   a control circuit communicatively coupled to the at least one processor, wherein the control circuit is configured to operate the light emitting device based upon the beam control status.

2. The system of claim 1, wherein the at least one processor fuses the object features and the image features by applying a multilayer perceptron to concatenated object features and image features.

3. The system of claim 1, wherein the object feature network is trained using data associated with manual driving and at least one corresponding output generated by the perception system.

4. The system of claim 1, wherein the image feature network is trained using data associated with manual driving and at least one corresponding image sensor output generated by an image sensor.

5. The system of claim 1, wherein the object feature network, image feature network, and feature fusion network are retrained during shadow mode to satisfy a predetermined safety confidence level.

6. The system of claim 1, wherein the instructions stored in the memory further cause the at least one processor to:
   determine a mismatch between a predicted beam control status of a fused feature and a corresponding manual driving data sample;
   in response to a mismatch between the predicted beam control status and the corresponding manual driving data sample, identify the fused feature as a conflicting sample; and
   modifying the object feature network, the image feature network, the fusion feature network, or any combinations thereof based on the conflicting sample.

7. A method, comprising:
   extracting, using at least one processor, object features from a perception system output to identify objects in an environment using an object feature network, wherein the object feature network outputs object features associated with a map prior used to extract a distance associated with the objects, wherein the distance governs an illumination intensity output by a light emitting device;
   extracting, using the at least one processor, image features from sensor data to identify environmental illumination information using an image feature network, wherein the image feature network outputs image features that comprise environmental information and data associated with an illumination of the environment;
   fusing, using the at least one processor, the object features and the image features into fused features using a feature fusion network that takes as input the object features and the image features and outputs fused features;
   predicting, using the at least one processor, a beam control status according to the fused features, wherein the beam control status indicates a high beam illumination intensity or a low beam illumination intensity of the light emitting device; and
   operating, using the at least one processor, the light emitting device based upon the beam control status.

8. The method of claim 7, wherein fusing the object features and the image features into fused features comprises applying a multilayer perceptron to concatenated object features and image features.

9. The method of claim 7, wherein the object feature network is trained using data associated with manual driving and at least one corresponding output generated by the perception system.

10. The method of claim 7, wherein the image feature network is trained using data associated with manual driving and at least one corresponding image sensor output generated by an image sensor.

11. The method of claim 7, wherein the object feature network, image feature network, and feature fusion network are retrained during shadow mode to satisfy a predetermined safety confidence level.

12. The method of claim 7, comprising:
   determining, using the at least one processor, a mismatch between the predicted beam control status of a fused feature and a corresponding manual driving data sample;
   in response to a mismatch between the predicted beam control status of the fused feature and the corresponding manual driving data sample, identifying, using the at least one processor, the fused feature as a conflicting sample; and
   modifying, using the at least one processor, the object feature network, the image feature network, the fusion feature network, or any combinations thereof based on the conflicting sample.

13. A non-transitory computer program product storing instructions that, when executed by at least one programmable processor of a vehicle, cause the at least one programmable computer processor to perform operations comprising:
   extracting object features from a perception system output to identify objects in an environment using an object feature network, wherein the object feature network outputs object features associated with a map prior used to extract a distance associated with the objects, wherein the distance governs an illumination intensity output by a light emitting device;
   extracting image features from sensor data to identify environmental illumination information using an image feature network, wherein the image feature network outputs image features that comprise environmental information and data associated with an illumination of the environment;
   fusing the object features and the image features into fused features using a feature fusion network that takes as input the object features and the image features and outputs fused features;
   predicting a beam control status according to the fused features, wherein the beam control status indicates a high beam illumination intensity or a low beam illumination intensity of the light emitting device; and
   operating the light emitting device based upon the beam control status.

14. The computer program product of claim 13, wherein fusing the object features and the image features into fused features comprises applying a multilayer perceptron to concatenated object features and image features.

15. The computer program product of claim 13, wherein the object feature network is trained using data associated with manual driving and at least one corresponding output generated by the perception system.

16. The computer program product of claim 13, wherein the image feature network is trained using data associated with manual driving and at least one corresponding image sensor output generated by an image sensor.

17. The computer program product of claim 13, wherein the object feature network, image feature network, and feature fusion network are retrained during shadow mode to satisfy a predetermined safety confidence level.

18. The computer program product of claim 13, comprising:
   determining, using the processor, a mismatch between the predicted beam control status of a fused feature and a corresponding manual driving data sample;
   in response to a mismatch between the predicted beam control status of the fused feature and the corresponding manual driving data sample, identify, using the processor, the fused feature as a conflicting sample; and
   modifying, using the processor, the object feature network, the image feature network, the fusion feature network, or any combinations thereof based on the conflicting sample.

19. The system of claim 1, comprising a light emitting device that outputs light to produce the illumination of the environment.

20. The method of claim 7, wherein a light emitting device outputs light to produce the illumination of the environment.

* * * * *

UNITED STATES PATENT AND TRADEMARK OFFICE
CERTIFICATE OF CORRECTION

PATENT NO. : 11,701,996 B2
APPLICATION NO. : 17/528701
DATED : July 18, 2023
INVENTOR(S) : Lubing Zhou, Xiaoli Meng and Karan Rajendra Shetti It is certified that error appears in the above-identified patent and that said Letters Patent is hereby corrected as shown below:

On the Title Page

Column 2, Item (56) (Other Publications); Line 1, Delete "Suiface" and insert -- Surface --.

Signed and Sealed this
Fifth Day of September, 2023

Katherine Kelly Vidal
*Director of the United States Patent and Trademark Office*